Sept. 26, 1961  H. RINGGENBERG  3,001,758
GATE VALVE

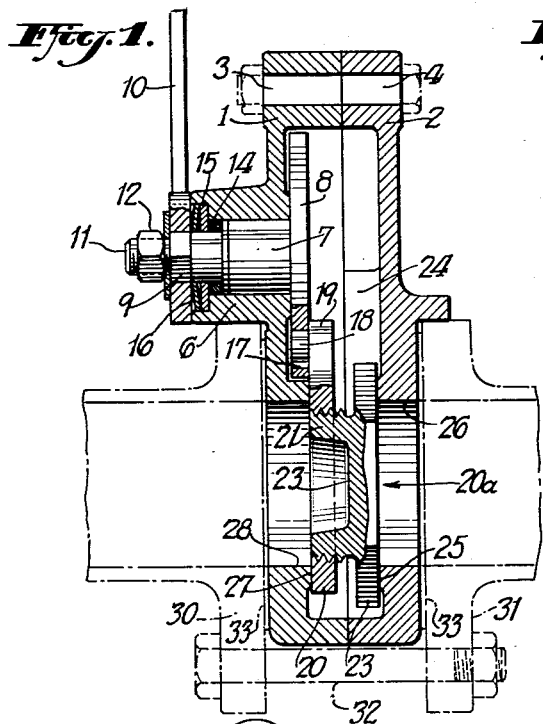

Filed Dec. 17, 1958  2 Sheets-Sheet 2

INVENTOR
HANS RINGGENBERG.
BY K. A. Mayr
ATTORNEY

United States Patent Office 3,001,758
Patented Sept. 26, 1961

3,001,758
GATE VALVE
Hans Ringgenberg, 34 Talhofweg, Winterthur, Switzerland
Filed Dec. 17, 1958, Ser. No. 780,968
Claims priority, application Switzerland Dec. 18, 1957
15 Claims. (Cl. 251—168)

The invention relates to a gate valve for pipe lines with divided casing and a multipart closing member which is moved by means of a crank gear, and whose parts, when moved to the closed position, are spread apart by means of cooperating screw thread surfaces provided on said parts, when moved to the open position, are withdrawn into a pocket of the valve casing extending normal to the direction of flow. The casing with the pocket is divided in a plane normal to the direction of flow, the closing member being formed of two parts, of which one has a helically threaded surface against which abuts a corresponding surface of the other part. In the closed position one of the two parts of the closing member abuts against the inside of one of the casing parts for closing an orifice in line with the connected pipe line, and the other part of the closing member abuts against the inside of the second part of the casing for closing an orifice in line with the connected pipe line. One of the parts of the closing member is articulated to a crank arm of the crank gear and can be moved by the crank gear in a plane into the pocket while being permitted to swivel, the other part of the closing member being carried along by the first part in a straight guide parallel to the plane in which the first part moves and permitting only a translatory movement.

In the accompanying drawing three examples of execution of the object of the invention are illustrated.

FIG. 1 shows a longitudinal section through a gate valve according to the invention;

FIG. 2 is an inside view of one casing part with a driving disk placed therein, of the valve shown in FIG. 1;

FIG. 3 is an inside view of the other casing part showing the closing member;

FIG. 4 is an outside view of the casing part shown in FIG. 2;

Figure 5:
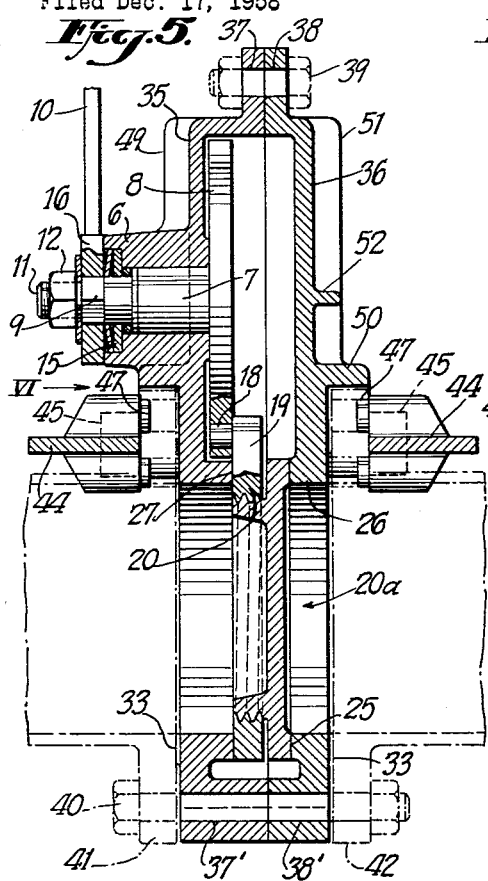
FIG. 5 shows a longitudinal section through a modified gate valve.

The gate valve according to FIGS. 1–4 has two flat casing or housing parts 1 and 2, each of which is provided at its flange-like edge with holes 3 and 4 respectively, through which holes bolts (not shown) can be placed in order to connect the two parts firmly to each other. Between the two casing parts 1 and 2 a packing can be clamped, or a packing paste may be employed.

The casing part 1 has on the outside a stiffening rib 5, widened in the middle to form a bearing-eye 6 carrying a stepped bolt 7, which is integral with a driving disk 8 located within the casing. At the outer side of the casing the bolt 7 has a square 9, which serves for fixing an operating lever 10. The free end 11 of the bolt 7 is provided with a thread on which a nut 12 is screwed, this nut securing the lever 10 on the square 9 through a washer 13. A packing ring 14 is pressed against the shoulder of the stepped bolt 7 by a solid washer 15 and a flexible washer 16.

The driving disk 8 is provided with a hole 17 which is not quite circular, but is somewhat widened in the radial direction of the disk 8. Into the hole 17 a pin 18 is inserted, which is provided on a lug 19 of the plane ring 20 furnished with internal thread. The ring 20 forms one part of a two-part closing member or valve gate assembly, whose other part 20a has a coaxial circular protuberance 21 furnished with an external thread, screwed into the ring 20. The protuberance 21 has a recess 22 and extends from a hexagonal plate 23. Internally the casing part 2 is provided with two parallel guideways 24 for two opposite sides of the plate 23. In the illustrated closed position of the valve gate assembly the plate 23 is seated on an annular seat 25 and blocks an aperture or port 26 of the casing part 2. In this position the ring 20 is seated on an annular seat 27 of the casing part 1 and, together with the protuberance 21, blocks an aperture or port 28 of this casing part which is further provided with two parallel guideways 29 for the ring 20.

In FIG. 1 it is shown by broken lines how the gate valve is fixed between two flanges 30 and 31 of two pipes (see also FIG. 4). Two of the bolts 32 serving to screw the flanges 30 and 31 to each other are passed not only through the holes of these flanges but also through the holes marked 3' and 4' of the casing parts 1 and 2 respectively. The reference numeral 33 indicates two packings. After removing the bolts 32, the gate valve can be drawn out between the flanges 30 and 31; it is therefore very easily connected to the pipes and removed therefrom.

To explain the operation of the valve it is assumed that the hole 17 in the driving plate is truly circular. In that case, if the lever 10 is rotated, the pin 18 moves exactly on the circle 34 shown chain-dotted in FIG. 3 and imparts a reciprocating movement to the ring 20 and to the plate 23. The driving plate 8 acts as a crank arm.

Now if the lever 10 is in the closing position 10' shown by a dash-dot line in FIG. 4 and the valve is closed, and if the lever 10 is moved in counterclockwise direction, the pin 18 moves in the sense of the arrow marked on the circle 34 of FIG. 3. In the illustrated bottom dead centre position, the movement of the ring 20 thereby effected is at first only slight; on the other hand this ring is at first appreciably swivelled in the clockwise sense in FIG. 3 and thereby screwed onto the protuberance 21, which cannot rotate because of the plate 23 being guided in the guideways 24. In this way the distance between the surfaces of the plate 23 and the seat 25 and/or between the ring 20 and the seat 27 is increased and the effective thickness of the closing member 20—20a is diminished so that this member can now easily be moved along the guideways 24 out of its closing position when the lever 10 is moved further.

After the lever 10 has been moved through more than 90°, the ring 20 begins to swivel counterclockwise, so that it screws back on the protuberance 21 and the effective thickness of the closing member 20—20a again increases. After moving through 180°, and thus in the top dead centre of the crank arm, the valve gate assembly 20—20a is firmly clamped between the driving plate 8 and the casing part 2 and thus secured in its open position. When the valve is being closed, the closing member is loosened, moved to closing position and pressed again onto the seats 25 and 27 in the closed position.

Since the play of the pin 18 in the hole 17 is great in the radial direction of the plate 8, the pin 18 does not move exactly in the circle 34. When the driving plate is swivelled out of the dead centre position, there is at first rather only a swivelling of the ring 20 and no translatory movement thereof so that the effective thickness of the closing member 20—20a is sufficiently diminished to afford the subsequent translatory movement at very little friction.

Figure 6:
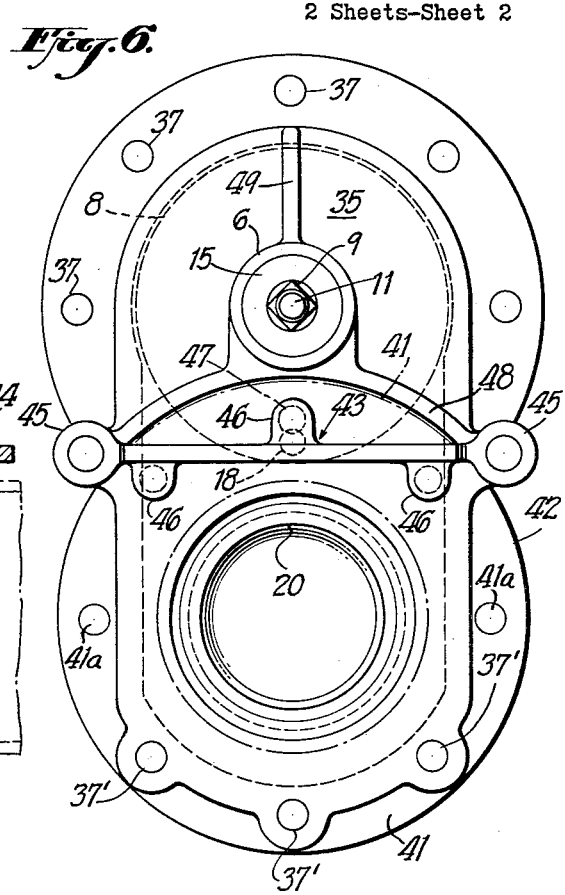
FIG. 6 is a side view of the valve shown in FIG. 5, looking in the direction of the arrow VI.

The gate valve according to FIGS. 5 and 6 is suitable for very large dimensions and/or for very high pressures. Whereas the movable parts are shaped exactly as in the valve shown in FIGS. 1–4, the casing parts 35 and 36 are provided with a greater number of holes 37, 37' and 38, 38' respectively for a correspondingly greater number of bolts 39 and 40 to hold these casing parts together. Five bolts 39 are provided, which pass exclusively through the flangelike edges of the casing parts 35 and 36 (instead of three in the first example) and three bolts 40, which pass also through the pipe flanges 41 and 42 (instead of two in the first example).

The bolts extending through the holes 41a of the flange 41 and the corresponding holes of the flange 42, do not pass through the casing parts 35 and 36.

The gate valve also has a clamp 43, having two strong stays 44 which are provided at their ends with eyes 45. Through the two pairs of eyes 45 situated opposite each other, two bolts (not shown) are passed, which are provided with suitable nuts and draw the two stays 44 firmly towards each other. On each stay 44 three pins 46 are welded laterally, whose short, stepped ends 47 individually fit into holes of the pipe flanges 41 and 42. By tightening the clamp 43, the connection of the two pipe flanges 41 and 42, as well as of the two casing parts 35 and 36, is considerably strengthened.

Beginning at the bearing eye 6 of the casing part 35, there is an arcuate stiffening rib 48, serving as support for the pipe flange 41, and a stiffening rib 49. The casing part 36 is provided with an arcuate stiffening rib 50, serving as support for the pipe flange 42, and there are also two stiffening ribs 51 and 52 placed at a right angle to each other.

The described gate valves have the advantage of closing very tight. As compared with known gate valves, in which a pressing of the slide on its seat in the closing position is obtained by other means, they are of simpler construction and have considerably less volume and weight. As compared with many gate valves used in practice, the saving in weight amounts to more than 50%. The two flat casing parts 1, 2 and 35, 36 can be cast in very simple moulds and are very easy to machine.

Since the plate 23 is shaped as a regular hexagon, it can be erected in positions displaced by 60° with respect to each other, thus allowing adjustment of the pressure that has to be exerted on the seating faces 25, 27 by the closing member 20—20a in the closed position. The plate could also have the shape of a square of an octagon, and the like, i.e. the shape of a regular polygon with an even number of sides. To permit different initial settings of the closing member, a plurality of holes 17 could be provided in the driving disk 8, in particular a hole with somewhat different radial play, set at 180° opposite the hole 17, and the pin 18 could be inserted into one or another of these holes.

It is, of course, not necessary that the bolt 7 and the driving disk 8 are made in one piece, since the parts 7 and 8 can be connected firmly by other means. Likewise, the protuberance 21 need not be integral with the plate 23, although this is preferred for the sake of safety. Further, it may be mentioned that the crank arm 8 can be kinematically connected in any manner whatever with the operating member 10, instead of in the very simple manner here represented.

The pin 18 could be provided on the disk 8 instead of on the ring 20, and correspondingly the hole 17 could be in the ring 20 instead of in the disk 8. The ring 20 could be guided in the casing part 2 and the six-sided plate 23 in the casing part 1, the position of the disk 8 being unchanged.

Instead of providing a clamp 43, two stiffening ribs corresponding to the stays 44 could be welded onto the pipe flanges 41 and 42, and these ribs connected to each other by bolts at their ends.

In cases where the gate valve is intended for a very viscous liquid, for instance crude oil or tar, other casing parts can be provided which form a hollow space for instance with the casing part 1 and/or the casing part 2, in which hollow space steam or hot water circulates, or an electric heating device may be arranged. These casing parts may also be fixed if necessary onto the casing parts 1 and 2 with the same bolts that serve for connecting the casing parts 1 and 2.

Instead of the screw connection of the closing parts 20, 20a, circular cams having axially inclined surfaces could also be provided in order to attain the same effect.

Figure 7:
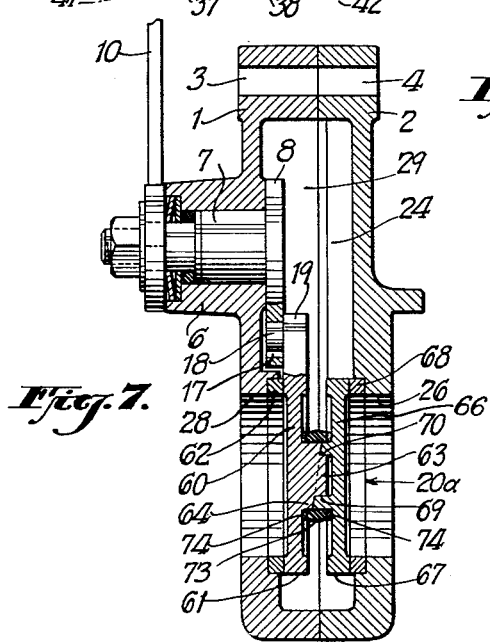
FIG. 7 shows a longitudinal section through a third modification of a gate valve according to the invention.

The gate valve according to FIG. 7 has two flat casing parts 1 and 2, each of which is provided at its flange-like edge with holes 3 and 4 respectively through which bolts (not shown) are passed, in order to connect the two casing parts firmly to each other. The casing or housing part 1 has a bearing eye 6 carrying a stepped bolt 7, which is made in one piece with a driving disk 8 located in the casing and on which an operating lever 10 is fixed. The driving disk 8 is provided with a hole 17 which is somewhat widened in the radial direction of this disk. Into the hole 17 extends a pin 18 which is provided on a lug 19 of a closing part 60. This closing part 60 is now not a ring, as in the embodiments of the invention shown in FIGS. 1–6, but a disk having a relatively thick rim 61. In the illustrated closed position, one side of the rim 61 rests on a bronze ring 62, which is arranged in a suitable recess of the casing part 1 at its port 28.

On the disk 60 an inwardly projecting, coaxial pin 63 is provided, surrounded by an annular cam 64 made in one piece with the pin 63 and with the disk 60, the front face of this cam being helical and forming one full turn of a screw thread. A step is thus present in this cam.

The other valve gate assembly part 66 of the two-part closing 60, 66 is also a disk with the edge or rim 67 thickened at both sides. One side of the edge 67 abuts against a bronze ring 68, which can be arranged in a suitable recess of the casing part 2 at its aperture 26. In the center of the disk 66 an annular cam 69 is provided, having a central cylindrcial cavity 70 into which the pin 63 extends. The front face of the cam 69 is helical and forms one screw thread corresponding to that on the cam 64 and having a step 71. The screw surfaces of the two cams 64 and 69 engage each other.

Figure 8:
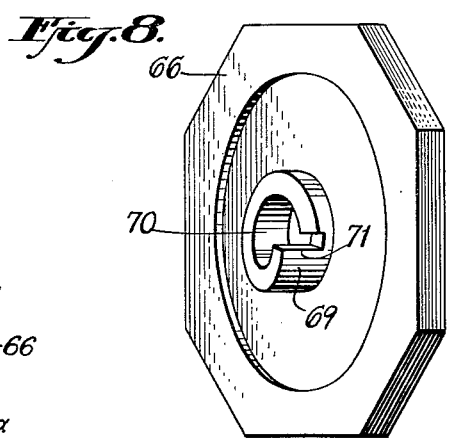
FIG. 8 is a perspective illustration of a part of the closing member of the valve shown in FIG. 7.

FIG. 8 is a perspective illustration of the part 66 which is octagonal and is guided in two parallel guideways 24 of the casing part 2 and cannot turn when it is moved, since two opposite sides of the octagon slidably engage these guideways. The disk 60 is circular and can be moved in two parallel guideways 29 of the casing part 1 as shown in FIG. 2.

The two cams 64 and 69 are preferably surrounded by an elastically compressible packing sleeve 73 having a convex outside surface. A relatively rigid ring 74 is provided at each end of the part 73 which rings are pressed outwards, and therefore towards the disks 60 and 66, by the action of the resilient middle part 73, and thus render the cams tight against the liquid in the casing 1, 2, independent of the distance between the disks.

The gate valve shown in FIGS. 7 and 8 operates as follows. In the illustrated closed position, the steps of the cams 64 and 69 are at a certain angular distance apart. In this position the disks 60 and 66 are at their greatest distance apart, in other words the rims 61 and 67 of the disks press against the seats formed by the rings 62 and 68 respectively. The disks 60 and 66 are of such dimensions that their relatively thin center portions form diaphragms which are resiliently flexible and can yield for instance, by approximately 0.2–1 mm., when the gate valve is new. Thereby the thickened edges or rims 61 and 67 do not take part in the deformation of the diaphragm portions of the disks 60 and 66 respectively and thus maintain their correct position parallel to the seating rings 62 and 68 respectively. The resiliency of the disks will therefore not endanger the good tightness of the valve. If the rings 62 and 68, as well as the rims 61 and 67 are somewhat worn, the pressure exerted by the resilient disks 60 and 66 in the closed position will become somewhat less, but the edges 61 and 67 will always be pressed onto the seating rings 62 and 68, although the distance between the disks 61 and 66 as determined by the cams 64 and 69 is the same as when the valve is new—except for the slight wear of the cams themselves, which would also cause a lack of tightness of the valve if the disks 60 and 66 were rigid. The closing parts, corresponding to the disks 60 and 66, of the gate valves illustrated in FIGS. 1–6 are extremely rigid. In order to obtain good resiliency of the disks 60 and 66, it is preferable to make the diameter of the cams 64 and 69 not greater than 40% of the diameter of the disks.

In order to open the gate valve, the lever 10 is swivelled, and—through the crank arm formed by the driving disk 8, the pin 18 engaging in its hole 17, and the lug 19—draws the circular disk 60 upwards in the guideways 29, so that the disk is swivelled. The pin 63 on the disk 60 takes the disk 66 along in the guideways 24. Since the disk 66 cannot rotate, the disks 60 and 66 swivel relatively to each other whereby the steps of the cams 64 and 69 approach each other and the distance between the disks 60 and 66 becomes less so that they are loosened from the seating rings 62 and 68. As the closing member formed by the disks 60 and 66 is drawn upwards the apertures 26 and 28 are opened.

I claim:

1. A gate valve interposed between two pipes and comprising a housing forming a valve chamber having aligned ports provided with opposed parallel valve seats in the chamber and forming a passage, said housing being divided into two parts in a plane normal to said passage and having a substantially flat pocket communicating with said passage and extending in a direction transverse to said passage, an expansible valve gate assembly mounted for guided rectilinear movement in the chamber transversely to said seats and ports to open and close the valve, said assembly including a first part and a second part adapted to individually bear on the valve seats, said first part being rotatably connected to and supporting said second part, the rotation axis substantially coinciding with the axis of said passage when said assembly is in valve closing position, each of said parts being provided with a helical surface substantially coaxial of said passage when said assembly is in valve closing position, the helical surface of one part being complementary to and engaging the helical surface of the other part for affording relative axial movement of said parts upon rotation of one part relative to the other part in one or in the opposite direction, said first part being rotatable in said housing around the axis of said helical surfaces, said second part being unrotatable and slidable in said housing, and a crank gear mounted on said housing and having a crank arm placed in said pocket and being articulated to said first part for swivelling said first part on said second part and moving said assembly into said pocket for opening the valve and simultaneously allowing movement of said parts towards one another and moving said assembly out of said pocket for closing the valve and simultaneously spreading said parts apart.

2. A gate valve as defined in claim 1 wherein said first part is in the form of a ring, said helical surface of said first part forming an internal screw thread, said second part being in the form of a plate having a central protuberance extending into said ring, and said helical surface on said second part forming a screw thread fitting the thread of said first part.

3. A gate valve according to claim 2 wherein said plate has a hexagonal configuration.

4. A gate valve as defined in claim 1 wherein said second part is in the form of a plate having a periphery shaped as a regular polygon having an even number of sides.

5. A gate valve according to claim 1 wherein said crank arm is in the form of a driving disk having an aperture, a pin being mounted on said first part and extending into said aperture.

6. A gate valve according to claim 5 wherein said aperture is oblong in the radial direction of the driving disk whereby said pin has a greater play in the radial direction than in the circumferential direction of the driving disk.

7. A gate valve as defined in claim 1 including two flanges adapted to be connected to the pipes between which the valve is interposed, said housing having a portion adjacent to said ports and being interposed between said flanges, and bolts extending through said flanges for pressing the latter against said housing and pressing the two housing parts together.

8. A gate valve according to claim 7 including a clamp comprising two stays individually placed outside of said flanges, and means for pressing said stays against the flanges and the latter against said housing.

9. A gate valve as defined in claim 1 wherein said parts are in the shape of disks, each disk having a protuberance, one of said protuberances having a cylindrical cavity, the other of said protuberances having a pin portion extending into said cavity, said protuberances individually having an axial face portion, said face portions facing each other and forming said helical surfaces.

10. A gate valve as defined in claim 9 wherein said helical surfaces form a substantially complete turn.

11. A gate valve as defined in claim 9 wherein said disks individually have a relatively thin diaphragm portion extending radially from said protuberances and being resiliently flexible in the axial direction of said protuberances.

12. A gate valve according to claim 11 wherein said disks individually have a relatively thick rim portion, said rim portions individually resting on said seats when said assembly is in valve closing position.

13. A gate valve according to claim 12 wherein the diameter of said protuberances is not greater than 40% of the diameter of said disks.

14. A gate valve according to claim 9 wherein said protuberances are cylindrical, a packing sleeve being provided surrounding said protuberances.

15. A gate valve according to claim 14 wherein said packing sleeve has a compressed resilient middle portion and relatively rigid end portions which are pressed against said disks by the axial pressure of said middle portion.

References Cited in the file of this patent

UNITED STATES PATENTS

| | | |
|---|---|---|
| 146,796 | Wilson | Jan. 27, 1874 |
| 298,738 | Ellis | May 20, 1884 |
| 384,849 | Hood | June 19, 1888 |
| 673,925 | Powell | May 14, 1901 |
| 711,262 | Riegler | Oct. 14, 1902 |
| 1,324,351 | Haynes | Dec. 9, 1919 |
| 1,462,635 | Edler | July 24, 1923 |
| 2,823,888 | Wynn | Feb. 18, 1958 |
| 2,850,260 | Perazone | Sept. 2, 1958 |
| 2,866,253 | Wynn | Dec. 30, 1958 |

FOREIGN PATENTS

| | | |
|---|---|---|
| 90,015 | Germany | Jan. 6, 1897 |